July 16, 1968   A. L. FREEDLANDER ET AL   3,392,516
BLADE FOR MOWING
Filed July 21, 1967
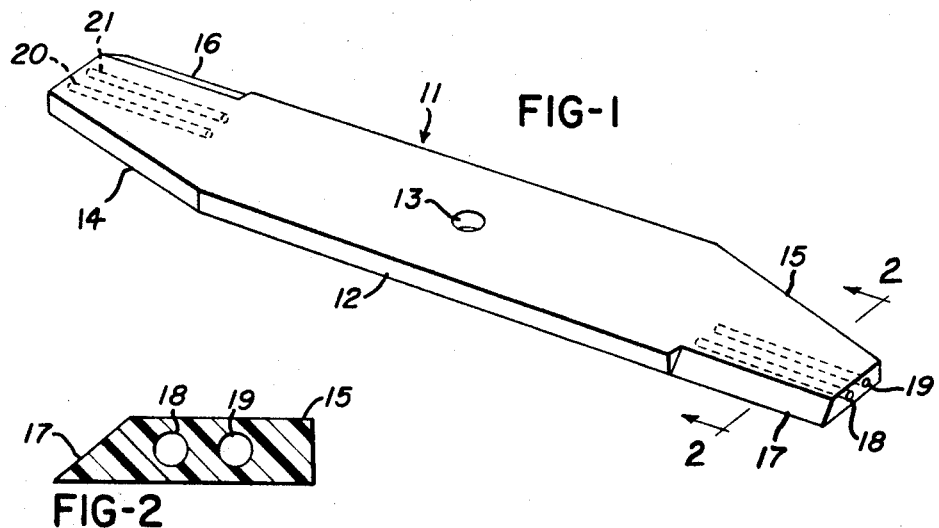
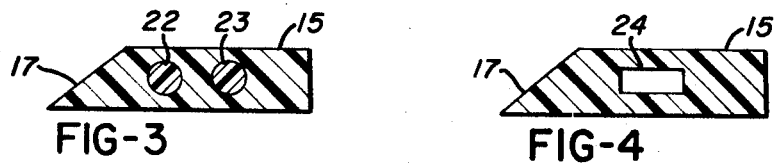
INVENTORS
ABRAHAM L. FREEDLANDER
WAYNE C. GARRETT
ROBERT E. MATTHEWS
BY *Reuben Wolk*
ATTORNEY United States Patent Office 3,392,516
Patented July 16, 1968

3,392,516
BLADE FOR MOWING
Abraham L. Freedlander, Dayton, Ohio, and Wayne C. Garrett and Robert E. Matthews, Waynesville, N.C., assignors to Dayco Corporation, Dayton, Ohio, a corporation of Delaware
Filed July 21, 1967, Ser. No. 655,196
The portion of the term of the patent subsequent to Sept. 26, 1984, has been disclaimed
2 Claims. (Cl. 56—295)

ABSTRACT OF THE DISCLOSURE

A flexible elastomeric lawn mower blade having longitudinal apertures in the arms for increasing flexibility.

---

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blade to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable objects, such as a large rock or post, is encountered, since the blade is still permitted to flex and ride over this object; at the same time, the blade has a certain amount of inheresnt elasticity that tends to cushion the initial shock and prevent the blade from breaking. In the case of small rocks, etc., the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

In our application Ser. No. 579,304, filed on Sept. 14, 1966, and now Patent No. 3,343,350, we have described an invention relating to a blade formed of a non-reinforced homogeneous flexible elastomeric material. The present invention relates to a somewhat different form of this blade, having additional properties of flexibility. This may be necessary because in certain types of lawns the grass may not be as stiff and resistant to cutting, and may therefore permit a more flexible blade and thus provide a further margin of safety when striking a foreign object. This additional flexibility is accomplished by providing longitudinal apertures within the arms of the blade to permit the arms to yield more easily when striking a shoe, rock, or other foreign object.

The invention will be more fully understood by referring to the following description and drawings, in which:

FIGURE 1 is a perspective view of a novel blade in accordance with the invention.

FIGURE 2 is a cross section of the blade taken along line 2—2 of FIGURE 1.

FIGURES 3 and 4 are views similar to FIGURE 2 illustrating modified forms of the invention.

Referring now to the drawing, FIGURES 1 and 2 illustrate the novel lawn mower blade 11 which is generally rectangular in shape and has a central portion 12 having its maximum width at the region of the center, and a mounting hole 13 located in the center of the blade. The blade has outwardly extending arms 14 and 15 tapering inwardly to the outer edges thereof. The principal body of which this blade is formed is an elastomer, preferably a urethane elastomer of the type more fully described in the above-referenced patent application. As indicated above, the material provides a cutting member and yet has the necessary flexibility to minimize injuries. The outermost edge portions of the blade are beleveled to provide cutting edges 16 and 17.

In order to provide additional flexibility for the purposes described above, a number of longitudinally extending apertures 18, 19, 20, and 21 are placed in the arm, extending from the tips thereof, inwardly toward the center. In this form of the invention, the apertures are circular in cross section, but the exact number of apertures, the length, and diameter are not critical and may be varied in accordance with the required design. These apertures render the arms of the blade more flexible so that when it strikes a rock or shoe it will tend to flex up and ride over this object.

FIGURE 3 illustrates a modified form of the invention in which the apertures, instead of being left open, are filled with a soft flexible material such as foam rubber, urethane or vinyl foam, or a soft form of urethane, vinyl, rubber or similar elastomer or plastic. This may provide additional flexibility for the arms of the blade. The filling material is designated by reference numerals 22 and 23.

FIGURE 4 illustrates a modification in the cross-sectional shape of the apertures. The aperture 24 is rectangular, but it should be understood that the apertures could have triangular, elliptical, or any other cross section which is convenient. Other modifications are contemplated as falling within the scope of the invention.

We claim:

1. In a lawn mower having a rotatable shaft, a cutting blade mounted on said shaft principally composed of a flexible urethane elastomer, said blade having outwardly extending arms with apertures extending longitudinally from the tips thereof inwardly toward the center of said blade to increase the flexibility of said arms.

2. The blade of claim 1 including soft flexible material within said apertures.

References Cited

UNITED STATES PATENTS

| | | | |
|---|---|---|---|
| 3,156,082 | 11/1964 | Joyner | 56—295 |
| 3,176,455 | 4/1965 | Buchanan | 56—295 |
| 3,315,452 | 4/1967 | Rossi | 56—295 |
| 3,320,732 | 5/1967 | Kirk | 56—295 |
| 3,343,350 | 9/1967 | Freedlander et al. | 56—295 |

ABRAHAM G. STONE, *Primary Examiner.*

ANTONIO F. GUIDA, *Examiner.*

P. A. RAZZANO, *Assistant Examiner.*